J. M. SPANGLER, DEC'D.

THE HOOVER SUCTION SWEEPER COMPANY, ASSIGNEE.

SUCTION CARPET SWEEPER.

APPLICATION FILED JUNE 22, 1917.

Reissued July 18, 1922.

15,414.

2 SHEETS—SHEET 1.

Witnesses:
Edward T. Wray
Christina Deans.

Inventor:
James M. Spangler.
By Parker & Carter
Attys.

J. M. SPANGLER, DEC'D.

THE HOOVER SUCTION-SWEEPER COMPANY, ASSIGNEE.

SUCTION CARPET SWEEPER.

APPLICATION FILED JUNE 22, 1917.

Reissued July 18, 1922. 15,414.

2 SHEETS—SHEET 2.

Witnesses:
Edward T. Wray.
Christina Deans.

Inventor:
James M. Spangler.
By Parker & Carter
Attys.

UNITED STATES PATENT OFFICE.

JAMES M. SPANGLER, DECEASED, LATE OF CANTON, OHIO, BY THE HOOVER SUCTION SWEEPER COMPANY, OF NEW BERLIN, OHIO, A CORPORATION OF OHIO, ASSIGNEE.

SUCTION CARPET SWEEPER.

15,414. Specification of Reissued Letters Patent. Reissued July 18, 1922.

Original No. 1,151,731, dated August 31, 1915, Serial No. 733,988, filed November 29, 1912. Application for reissue filed June 22, 1917. Serial No. 176,445.

*To all whom it may concern:*

Be it known that JAMES MURRAY SPANGLER, deceased, late of the city of Canton, county of Stark, State of Ohio, did invent certain new and useful Improvements in Suction Carpet Sweepers, of which the following is a full, clear, and exact description.

This invention relates to improvements in carpet sweepers provided with means for producing a suction or strong inrush of air into the device, which inrush of air operates in conjunction with the brush for the purpose of brushing and pneumatically cleaning floors and floor coverings and similar surfaces.

The objects of this invention are to generally improve devices of the character mentioned, and to provide a construction which will be composed of few and simple parts put together in a practical, mechanical manner, the various parts being so exactly and peculiarly adapted to each other that they combine to produce a very superior, substantial and efficient carpet sweeper.

One of the important objects of the invention is to provide a brush and brush adjustment in combination with a driving wheel and sweeper supporting adjustment for the purpose of regulating and adjusting the sweeper in accordance with the class of work which it is intended to do and to accommodate the natural wear of the brush.

These objects, together with other objects, apparent to those skilled in the art may be attained by the construction illustrated in the accompanying drawings, although the invention may be embodied in other forms, the construction illustrated being chosen by way of example.

In the drawings Figure 1 is a perspective view of a suction carpet sweeper embodying my invention.

Throughout the several views similar reference numerals indicate similar parts.

Figure 1:
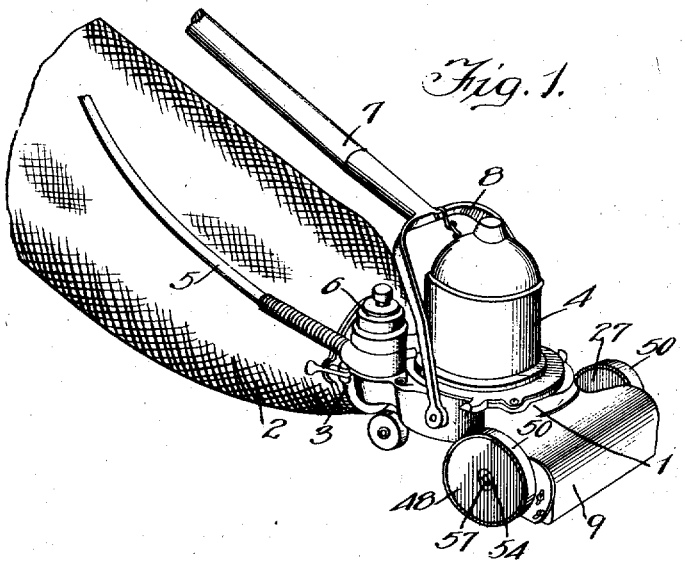

More specifically describing the construction illustrated in said drawings, the numeral 1 indicates the main casing of the carpet sweeper within which is mounted a fan $1^a$ such as is well known to those skilled in the art and which is adapted to exhaust the air from said casing into the dust bag 2, which is connected to the outlet 3 of the casing and serves as a receptacle for the dirt and dust lifted by the device. Said fan is preferably driven by an electric motor 4 mounted upon the casing, the flexible conductor 5 leading through the switch 6 serving to transmit the current from any suitable source to the motor. The handle 7 is pivotally connected to the casing 1 by means of the yoke 8 and is employed for manually moving the sweeper over the floor or surface to be cleaned.

The forward portion of the casing 1 is provided with a brush casing 9 which extends transversely and is arranged at a somewhat lower level than the main portion of the casing 1. The interior of said casing 9 is substantially cylindrical, but the side of said casing adjacent the floor is somewhat squared off on a plane parallel with the floor, as shown in Fig. 6, and a slot-like brush and intake opening at 10 extending parallel with the axis of cylindricity of the casing 9 is arranged upon the lower side of said casing 9, as is common in carpet sweepers of this general character.

It should be noted that it is important in sweepers of the class to which this invention belongs, to have the brush or sweeping means operate in an effective manner so as to free the dust and dirt from the floor or floor coverings, permit the inrush of air to accomplish its work more thoroughly and to assist said inrush of air in picking up particles which have a tendency to adhere to the surface being cleaned. The motor and fan portion of the device having been properly constructed and adjusted by the manufacturer require little or no attention through years of use and are substantially permanently adjusted for all classes and kinds of work to which the sweeper may be adapted, but in the art of suction cleaning it is a well known fact that it is important to adjust the intake opening with relation to the plane of the surface being cleaned as an adjustment of said opening too far removed from said surface permits an inrush of air without lifting the dirt and dust, whereas too close adjustment of said opening to said surface reduces the volume of air permitted to enter and draws said opening down, frequently impeding the free movement of the sweeper over the floor, thus not only lessening the effectiveness of the device, but also increasing the difficulty of its management.

It will also be understood that the brushes in sweepers of this character must be properly adjusted with reference to the brush or intake opening so as to effectively contact with the surface being cleaned, while at the same time having proper adjustment with relation to the intake opening in order that the best results may be accomplished. Not only is this true with reference to any surface upon which the device is used, but such adjustment may be intelligently varied to suit conditions, for the sweeper commonly employed in a home having mostly hardwood or other uncovered floors and few and relatively thin rugs should be somewhat differently adjusted from a similar sweeper in use in a home having no bare floors and heavy, thick carpets. It should also be noted that, unlike the motor and fan, the brush is necessarily subjected to appreciable wear and means whereby said brush may be adjusted to compensate for such wear are essential. It will be apparent, therefore, that in a sweeper of the character concerned it is necessary that the traveling wheels or supporting means for the casing provided with the intake opening be adjustable with reference to said casing and that the brush mounted within said casing may also be adjustable with reference to said casing, and that said brush and traveling wheels or other supporting means be also adjustable with reference to each other.

Figure 6:
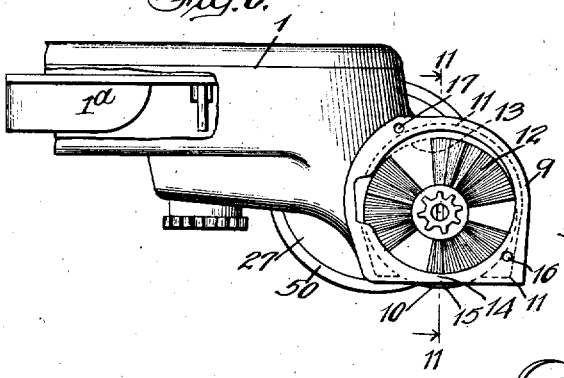
Fig. 6 is a view similar to Fig. 3, but with both driving wheel, wheel plate and brush hanger removed.
Figure 7:
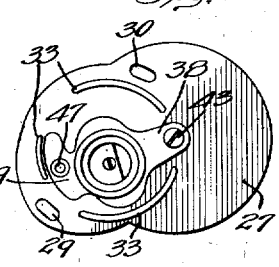
Fig. 7 is an inner side elevation of one of the wheel plates or brush carrying plates and the brush hanger connected thereto.

Further considering the drawings it will be noted that in Figure 6 the inner surface of the casing 9 is indicated by the dotted line 11 and the outer periphery of the bristles 12 of the brush indicated by the dotted circle 13. The end of the casing is provided with a slight, inwardly turned, annular flange 14 which in Figure 6 is shown as extending across the intake opening, forming a light bridge or tie at 15. In the flange 14 are arranged screw threaded apertures 16 and 17 for the purpose hereinafter more fully to appear.

Figure 11:
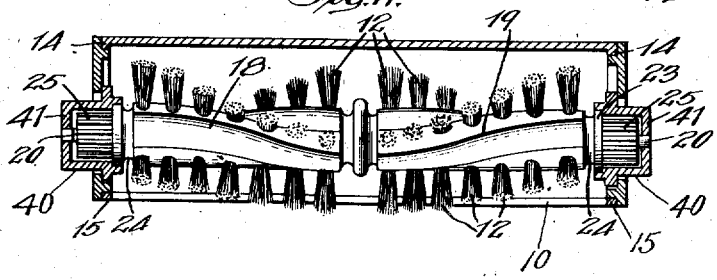
Fig. 11 is a sectional view through the brush casing on the line 11—11 of Fig. 6.
Figure 12:
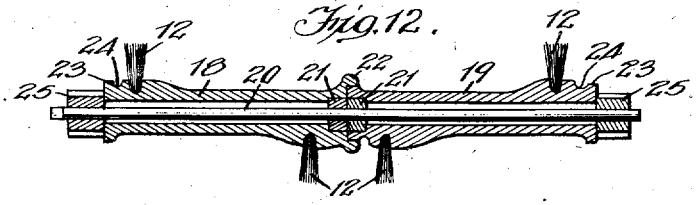
Fig. 12 is a longitudinal sectional view through the brush.

The construction of the brush is quite fully illustrated in Figures 11 and 12 where it will be noted that the same is made in two parts or members 18 and 19 arranged end to end and rotatably mounted upon a stationary brush shaft 20. Each of the brush members is provided with a longitudinal bore of greater diameter than the shaft 20 and an oil-impregnated fibrous bushing 21 is fixedly mounted within the bore at the inner end of each brush member, which bushings constitute the bearings of said members upon the shaft 20. In this manner a freely running, non-heating bearing is provided which does not require attention to keep it lubricated and in good condition. The inner end of the member 18 is provided with an outstanding annular rib 22 which covers the joint where the two members abut, producing a construction wherein it may be said that the inner end of the member 19 rotates within a recess in the inner end of the member 18, as clearly shown in Figure 12. The outer surface of the rib 22 being rounded, acts as a thread guard and prevents threads and the like from being wound into the space or joint between the members 18 and 19. When a thread is picked up by the bristles of the brush and begins to wind upon the brush members the rib 22 will guide it entirely over on to one or other of the members, thus effectually guarding the brush against the trouble of thread-binding. The extreme outer ends of the members 18 and 19 are provided with the integral disk portions 23 on the inner side of which the depressed annular groove 24 is arranged for the purpose of acting as a thread guard to prevent threads being wound about the members 18 and 19 at the ends and thus thread-binding the same. A pinion 25 is fixedly connected to the outer end of each brush member or is formed integrally therewith as may be preferred and is adapted to rotate about the shaft 20 with the member to which it is connected.

Figure 9:
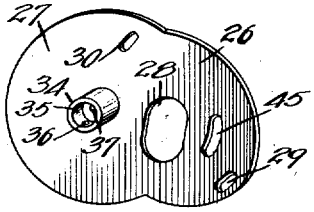
Fig. 9 is a perspective view of the wheel plate.
Figure 10:
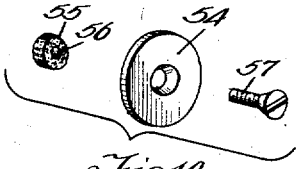
Fig. 10 is a perspective view of the lubricating packing and wheel retaining screw and washer.

At each end of the casing 9 is provided a wheel plate, one of which is shown in Figure 9. Said wheel plate consists of a forward, casing closing portion 26 and a rear, driving wheel backing portion 27, said portions 26 and 27 being formed integrally and preferably in the same plane. In the midst of the portion 26 is a brush hanger aperture 28 which is in the form of a vertically disposed slot permitting vertical adjustment of the brush with reference to the wheel plate as hereinafter described.

Adjacent the lower front edge of the portion 26 is an aperture 29, and in the upper portion of the plate is the aperture 30, said apertures being substantially diametrically opposite each other, considering the circular form of the casing 9, and each of said apertures 29 and 30 being in the form of a slot extending in the direction of the curvature of the casing 9. Machine screws 31 and 32 extend through the apertures 29 and 30 respectively and into the apertures 16 and 17 for the purpose of clamping the wheel plate to the end of the casing 9, the slotted character of the apertures 29 and 30 permitting some rotary adjustment of the wheel plate about the axis of curvature of said casing 9 and the said screws being adapted to clamp the plate to the flange 14 in any desired adjustment. For the purpose of holding the wheel plate in proper position with reference to the axis of curvature of the casing 9 the inner side of the wheel plate is provided with integral curved ribs 33 which engage the inner edge of the flange 14, as clearly illustrated in Figure 11.

On the outer side of the wheel plate substantially at the center of the portion 27 is arranged the outstanding wheel stud 34 for the attachment of the driving wheel. At its free end said stud is provided with a recess 35, from which recess an oil conducting aperture 36 leads to the outer bearing surface of the stud. From the bottom of said recess 35 a screw threaded aperture 37 leads entirely through the wheel plate.

Figure 8:
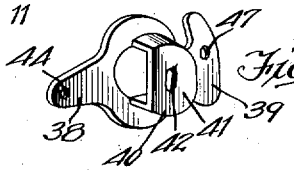
Fig. 8 is a perspective view of one of the brush hangers or brush adjusting plates.

On the inner side of each wheel plate is arranged a brush hanger, one of said hangers being illustrated in Figure 8. It will be noted that said hanger is provided with a connecting arm 38 and an adjusting head 39 and intermediate said head and said arm an outward extending pinion housing 40 is provided. Said housing 40 is adapted to extend through the aperture 28 of the wheel plate to which the hanger is attached and said housing is cut away at the side adjacent the arm 38. An end wall 41 forms an integral portion of said housing 40 and an aperture 42 in said wall 41 is adapted to receive the end of the shaft 20. Said aperture 42 may be round or elongated, at least one of the ends of the shaft 20 being correspondingly elongated or shaped to prevent rotation of the shaft 20. A screw 43 extending through the aperture 44 in the end of the arm 38 and into the screw threaded aperture 37 pivotally connects the brush hanger to the wheel plate, the axis of said pivotal connection being coincident with the axis of the stud 34. In the forward part of the portion 26 of the wheel plate is a slot 45 of curved form through which the screw 46 extends from the outer side of the wheel plate into the screw threaded aperture 47 in the head 39. The screw 46 being adjustable within the slot 45 permits the brush hanger to be pivotally moved upon the screw 43 as a center so as to move the pinion housing 40 up and down within the aperture 28, and said screw 46 may be drawn down firmly to hold the brush hanger in any desired adjustment within the limits of the slot 45.

Figure 4:
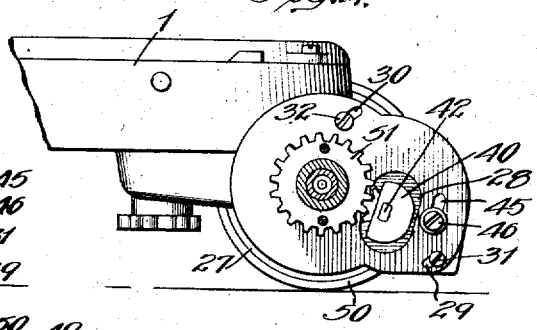
Fig. 4 is a similar view showing the driving wheel removed.

From an inspection of Figure 11 it will be noted that the pinions 25 extend into the housing 40 and the sides of the housing 40 adjacent the arms 38 being cut away, said pinions are partially exposed upon the outer side of the wheel plate, as clearly shown in Figure 4.

Figure 2:
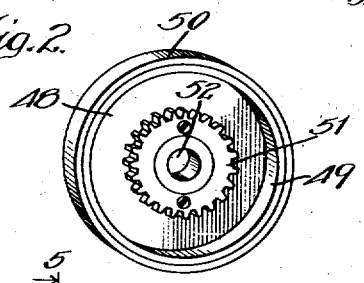
Fig. 2 is an inside perspective view of one of the driving wheels removed from its bearing.
Figure 3:
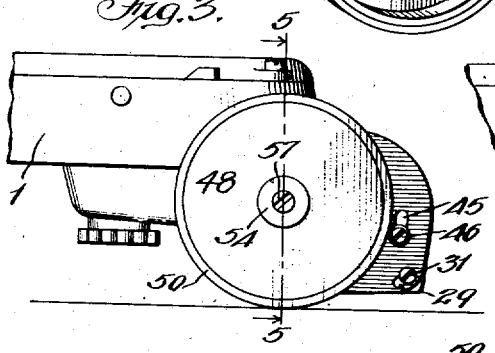
Fig. 3 is an outside end, fragmentary elevation of one of the front corners of the device.
Figure 5:
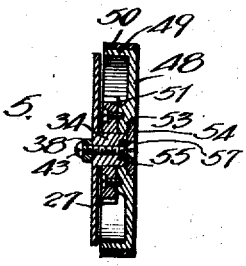
Fig. 5 is a sectional view taken on the line 5—5 of Fig. 3.

The driving wheels are each of the form particularly illustrated in Figures 2 and 5. It will be noted that said wheels comprise an outer disk portion 48 provided with a peripheral inturned flange 49 upon which is suitably mounted a rubber or other friction tie 50. On the inner side of the disk portion 48 is fixedly mounted a pinion 51. Extending centrally through said pinion 51 and disk 48 is a bearing aperture 52 adapted to rotatably receive the stud 34. On the outer side of the disk 48 is a circular recess at 53 concentric with the aperture 52 and a retaining washer 54 is adapted to be rotatably arranged within said recess. A felt or other lubricating holding packing 55 is adapted to be arranged within the recess 35 in the wheel stud and has a central aperture 56 through which the retaining screw 57 extends, as well as through the washer 54, said screw 57 being adapted to fit the screw threaded aperture 37, as illustrated in Figure 5. The stud 34 is of sufficient length to permit the driving wheel to freely rotate thereon when connected thereto as described, and the pinion 51 is adapted to mesh with the pinion 25.

It will be apparent that by reason of the construction just described each brush member will be geared to one of the driving wheels and will be free to rotate in accordance with the direction of rotation of said driving wheel.

To move the casing 9 toward or from the surface to be cleaned it is only necessary to slightly loosen the screws 31 and 32 and rotate the wheel plates about the axis of curvature of the casing 9, the ribs 33 retaining the plates in proper position regardless of their regular adjustment. In this way the driving wheels may be raised or lowered with reference to the casing for the purpose of adjusting the intake slot with reference to the surface to be cleaned. Such adjustment of the driving wheels, however, does not necessarily alter the adjustment of the brush. To adjust the brush with reference to the wheel plate it is only necessary to loosen the screws 46 and swing the brush hangers upon their pivoting screws 43, whereupon said screws 46 may be drawn up to hold the brush in its new adjustment. It is thus possible to adjust the brush and traveling wheels with relation to each other and to adjust either brush or wheels with relation to the casing 9.

Attention should be called to the packing 55 which when thoroughly saturated with oil feeds a proper quantity of the same through the oil aperture 36 to the external surface of the wheel stud and thus properly lubricates the driving wheel bearing.

What is claimed is:

1. A suction carpet sweeper comprising an elongated rotatable brush, a brush casing therefor having on its underside a cleaning intake opening, said casing at the ends provided with end walls having circular end openings adapted to permit endwise removal of said brush therethrough, wheel plates connected to the ends of said brush casing on the outer sides of said end walls and having inwardly disposed ribs engaging the curved edges of said end openings and adapted to permit rotary adjustment of said plates while maintaining said plates and end openings in concentric position, and traveling wheels rotatably connected to said wheel plates upon axes eccentric with reference to the common axis of said plates and openings.

2. A suction carpet sweeper comprising a casing provided with a cleaning intake opening, wheel plates adjustably connected to said casing, traveling wheels rotatably mounted upon said wheel plates, and a rotatable brush arranged within said casing and adjustably connected to said wheel plates.

3. A suction carpet sweeper comprising a casing provided with a cleaning intake opening, wheel plates connected to said casing and adapted for rotary adjustment with relation to said casing, traveling wheels rotatably connected to said wheel plates upon an axis eccentric with reference to the axis of said rotary adjustment, a rotatable brush arranged in said casing at said intake opening, brush hanging means pivotally connected to said wheel plates in the axis of said traveling wheels, said brush connected to said brush hanging means eccentrically with reference to the axis of said pivotal connection, and means for operatively connecting said wheels to said brush.

4. A suction carpet sweeper comprising an elongated rotatable brush, a casing therefor provided on its underside with a cleaning intake opening, said casing open at the ends and provided at each end with an inwardly disposed, integral, complete, circular flange defining a circular opening adapted to permit endwise removal of said brush therethrough, wheel plates on the outer sides of said flanges, closing said circular openings and provided on their inner sides with portions engaging the edges of said openings to permit rotary adjustment of said plates about centers common with the centers of said openings, traveling wheels rotatably mounted on the outer sides of said wheel plates upon axes eccentric with reference to said centers, and said brush, having its ends extended through said wheel plates and operatively connected to said traveling wheels.

5. The combination with a suction cleaner hood of a brush and a brush support the latter comprising a carrying and an adjusting plate pivoted one upon the other, the carrying plate rotatably mounted on the wall of the hood, the brush mounted on the adjusting plate and means for holding the two plates in predetermined angular positions with respect one to the other.

6. The combination with a suction cleaner hood of a brush and a brush support the latter comprising a carrying and an adjusting plate pivoted one upon the other, the carrying plate rotatably mounted on the wall of the hood, the brush mounted on the adjusting plate means for holding the two plates in predetermined angular positions with respect one to the other, and means for holding the brush support in predetermined positions with respect to the hood.

7. The combination with a suction cleaner hood of a brush and a brush support the latter comprising a carrying and an adjusting plate pivoted one upon the other, the carrying plate rotatably mounted on the wall of the hood, the brush mounted on the adjusting plate and means for holding the two plates in predetermined angular positions with respect one to the other, and hood supporting wheels whose axes are eccentric with the axis of rotation of the carrying plate and coincident with the line of pivotal support of the adjusting plates.

8. The combination with a suction cleaner hood of a brush and a brush support the latter comprising a carrying and an adjusting plate pivoted one upon the other, the carrying plate rotatably mounted on the wall of the hood, the brush mounted on the adjusting plate, means for holding the two plates in predetermined angular positions with respect one to the other, means for holding the brush support in predetermined positions with respect to the hood, and hood supporting wheels whose axes are eccentric with the axis of rotation of the carrying plate and coincident with the line of pivotal support of the adjusting plates.

9. The combination with a suction cleaner hood having a brush mounted in the open mouth thereof, of supporting means for the brush comprising a supporting and an adjusting plate pivoted one on the other, means for adjustably locking such plates together, the brush being supported on one of the plates, and one of the plates being removably mounted on the hood, the two plates and the brush being free to move as a unit with respect to the hood and means for holding such supporting means in a predetermined position on the hood.

10. The combination with a suction-cleaner hood of a brush and a brush support comprising a carrying plate mounted on the hood and means for holding the carrying plate in a predetermined position on the hood, and an adjusting plate pivoted to the carrying plate, the adjusting plate being provided with means whereby it may be locked in varying positions on the carrying plate and with a brush bearing.

11. The combination with a suction cleaner hood of a brush and a brush support the latter comprising a carrying and an adjusting plate pivoted one upon the other, the carrying plate rotatably mounted on the wall of the hood and the brush mounted on the adjusting plate, and supporting wheels mounted on the carrying plate.

12. In a suction cleaner the combination of a hood with a supporting plate adjustably mounted thereon supporting wheels mounted on the supporting plate an adjusting plate mounted on the supporting plate, a brush mounted on the adjusting plate, and a wheel associated with the brush and in line with and driven by the supporting wheel.

13. In a suction cleaner a brush body, a shaft upon which it is rotatably mounted, adjusting members apertured to engage the shaft, supporting members upon which the adjusting members are mounted, an open mouth suction hood in which the brush and supporting parts are contained, the supporting members being movably mounted on the end wall of said hood.

14. In a suction cleaner a brush body, a shaft upon which it is rotatably mounted, adjusting members apertured to engage the shaft, supporting members upon which the adjusting members are mounted, an open mouth suction hood in which the brush and supporting parts are contained, the supporting members being movably mounted on the end wall of said hood, means for locking the adjusting members in adjusted position on the supporting members.

15. A suction cleaner having an open mouth suction hood, a brush body, a shaft upon which it is rotatably mounted, adjusting members apertured to engage and support the ends of the shaft, supporting members upon which the adjusting members are pivoted, such supporting members being in turn movably mounted on the housing.

16. In a suction cleaner a brush body, a shaft upon which it is rotatably mounted, adjusting members upon which the shaft is mounted, supporting members upon which the adjusting members are mounted and means for locking the adjusting members in adjusting position on the supporting members such adjusting members pivoted on the supporting members and such supporting members movably mounted on the casing.

17. In a suction cleaner a nozzle provided with a dust inlet opening and an end apertured wall in combination with a brush supported near the nozzle adapted to be moved endwise through the aperture with a plate on which the brush is supported which serves as a closure for the end aperture a lever pivoted on the inside surface of the plate, means for supporting the brush thereon the plate being slotted concentric with the pivotal axis of the lever and locking and adjusting means extending through said slot engaging the lever.

18. In a suction cleaner, a nozzle provided with a dust inlet opening and an end apertured wall, in combination with a brush supported within the nozzle and adapted to be moved endwise through the aperture, a plate which serves as a closure for the end aperture, a lever pivoted on the plate, means for supporting the brush thereon and a cup-shaped part integral with the lever, surrounding the end of the brush.

19. In a suction cleaner, a nozzle provided with a dust inlet opening and an end apertured wall, in combination with a brush supported within the nozzle and adapted to be moved endwise through the aperture, a plate which serves as a closure for the end aperture, a lever pivoted on the plate, means for supporting the brush thereon and a cup-shaped part integral with the lever, surrounding the end of the brush, said brush end provided with a flange within the cup.

20. In a suction cleaner, a nozzle provided with a dust inlet opening and an end apertured wall, in combination with a brush supported within the nozzle and adapted to be moved endwise through the aperture, a plate which serves as a closure for the end aperture, a lever pivoted on the plate, means for supporting the brush thereon and a cup-shaped part integral with the lever, surrounding the end of the brush and a radial extension projecting outwardly from such cup-shaped part and pivoted on the plate.

21. In a suction cleaner, a nozzle provided with a dust inlet opening and an end apertured wall, in combination with a brush supported within the nozzle and adapted to be moved endwise through the aperture, a plate which serves as a closure for the end aperture, a lever pivoted on the plate, means for supporting the brush thereon and a cup-shaped part integral with the lever, surrounding the end of the brush and a radial extension projecting outwardly from such cup-shaped part and pivoted on the plate, and means for locking the cup-shaped part against the inner surface of the plate to hold it against rotation thereon.

22. The combination of a suction-cleaner hood having a revoluble brush mounted therein and supporting wheels therefor with wheel carrying means revolubly mounted concentrically of the hood and having wheel studs eccentric thereof, brush-adjusting means mounted coincident with the supporting wheel studs and independently adjustable with respect to the supporting wheel carrying means, and driving means between the supporting wheels and the revoluble brush.

23. The combination of a suction-cleaner hood, of a revoluble brush mounted therein, a driving-wheel mounted on said brush, a second driving-wheel operatively connected with said first driving wheel, a member supporting both driving-wheels and revolubly mounted on said suction-cleaner hood on an axis eccentric to said second driving wheel.

Signed at New Berlin in the county of Stark and State of Ohio this 8th day of June, 1917.

HERBERT W. HOOVER,

*Vice-President of The Hoover Suction Sweeper Co., assignee of James M. Spangler, deceased.*

Witnesses:

ESTA A. STONER,

R. C. WILLIGMANN.